April 16, 1957 J. L. HEISLER 2,789,024

RACK-MOUNT ARRANGEMENT

Filed June 7, 1951 2 Sheets-Sheet 1

INVENTOR.
JOSEPH L. HEISLER

BY Edward M. Farrell

ATTORNEY

April 16, 1957 J. L. HEISLER 2,789,024

RACK-MOUNT ARRANGEMENT

Filed June 7, 1951 2 Sheets-Sheet 2

INVENTOR.
JOSEPH L. HEISLER
BY Edward M. Farrell
ATTORNEY 2,789,024

RACK-MOUNT ARRANGEMENT

Joseph L. Heisler, Wayne, Pa., assignor to Tele-Dynamics Inc., a corporation of Pennsylvania Application June 7, 1951, Serial No. 230,372
2 Claims. (Cl. 312—333)

This invention relates to rack-mounting arrangements particularly suited for electronic equipment chassis and the like.

It is common practice, in communication or radio-telemetering equipment for example, to mount various groups of components upon different chassis each usually with an operating panel provided with dials, switches, meters or the like for adjustment or monitoring of the equipment. For various reasons, such as protection of the equipment or the operator, the chassis are mounted or stacked in a rack or cabinet with their operating panels accessible for adjustment and test or observation of operation of the equipment.

In accordance with this invention, there is provided a mounting structure for such chassis which permits withdrawal of the chassis from the rack to an inspection and testing position at which its components are in normal operating circuit condition; which permits ready removal of the chassis from the rack with concurrent disconnection of its components from those of other chassis and which provides for locking of the chassis in both inner and outer positions corresponding with operating and inspection positions. More particularly, the mounting structure comprises a chassis carrier and a movable mount for the carrier attached to the rack, the chassis being provided with lock actuators for locking the carriage and chassis in both the operating and inspection positions.

Further in accordance with this invention, there is provided locking means to prevent removal of the chassis from the carrier until the carrier is moved to its outer position and the chassis locking means moved to its release position.

For a more detailed understanding of this invention, reference is made to the accompanying drawings in which.

Figures 1, 3:
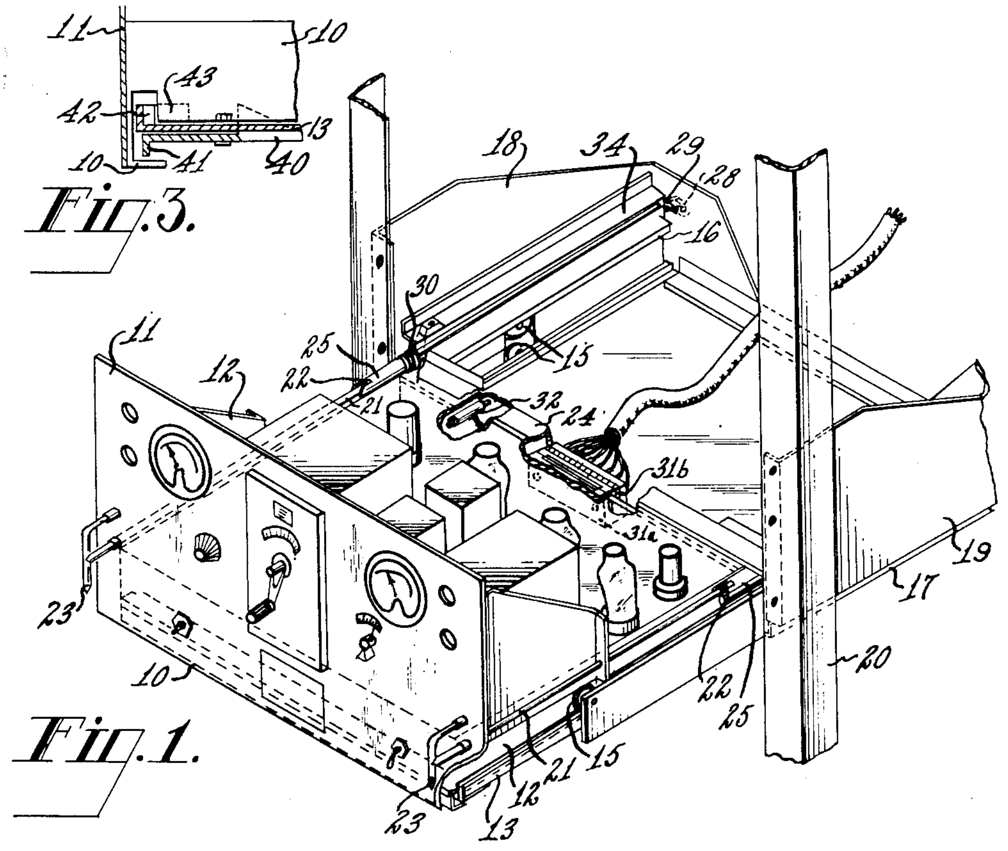
Fig. 1 is a perspective view showing a chassis supported in inspection position by a mounting arrangement embodying the invention.
Fig. 3 is a detail side view showing the chassis, the carrier and their interlocking mechanism.

Referring to the drawings, upon the chassis 10 is mounted a group of circuit components such as transformers, condensers, tubes, resistors and the like interconnected to form, for example, a unit of a radio-telemetering or communication system. The operating controls of the unit, associated meters, pilot lights and the like are mounted on front panel 11 of the chassis for actuation or observation when the unit is in either operating or test position in a rack or cabinet 20. In those positions, mating connectors **31*a*, 31*b* respectively mounted on chassis 10 and on a slidable carrier 13 provide for connection of the unit to other units including the source of its operating voltages. As later more specifically described, the chassis 10 and its rack-carrier 13** are locked to each other and to the rack in both of these positions. When the chassis is in the test position, it may be unlocked from its carrier and removed, the removal effecting separation of the mating connectors to electrically disconnect the unit from other units of the system.

With the unit in inspection or test position, routine check of operating and signal voltages, signal waveforms and the like may be made with the unit in its normal circuit relation with other units and in such position, replacements or repairs may be made. For major repairs or modifications, the chassis is unlocked from the carrier. No tools are required either for withdrawal or removal of the chassis from the rack.

The chassis 10 is detachably fastened to and supported by carrier 13 having flanged side members respectively received by slides forming movable mount 14. Movable mount 14 has wheels 15 upon which it rolls in a pair of fixed guide mounts 16 and 17 attached to frame members 18 and 19, respectively, of rack frame 20. Suitable stops, later identified, are provided to limit the outward movement of carrier 13 and mount 14 to the position shown in Figs. 1 and 4.

Figures 4, 5, 7, 8, 9:
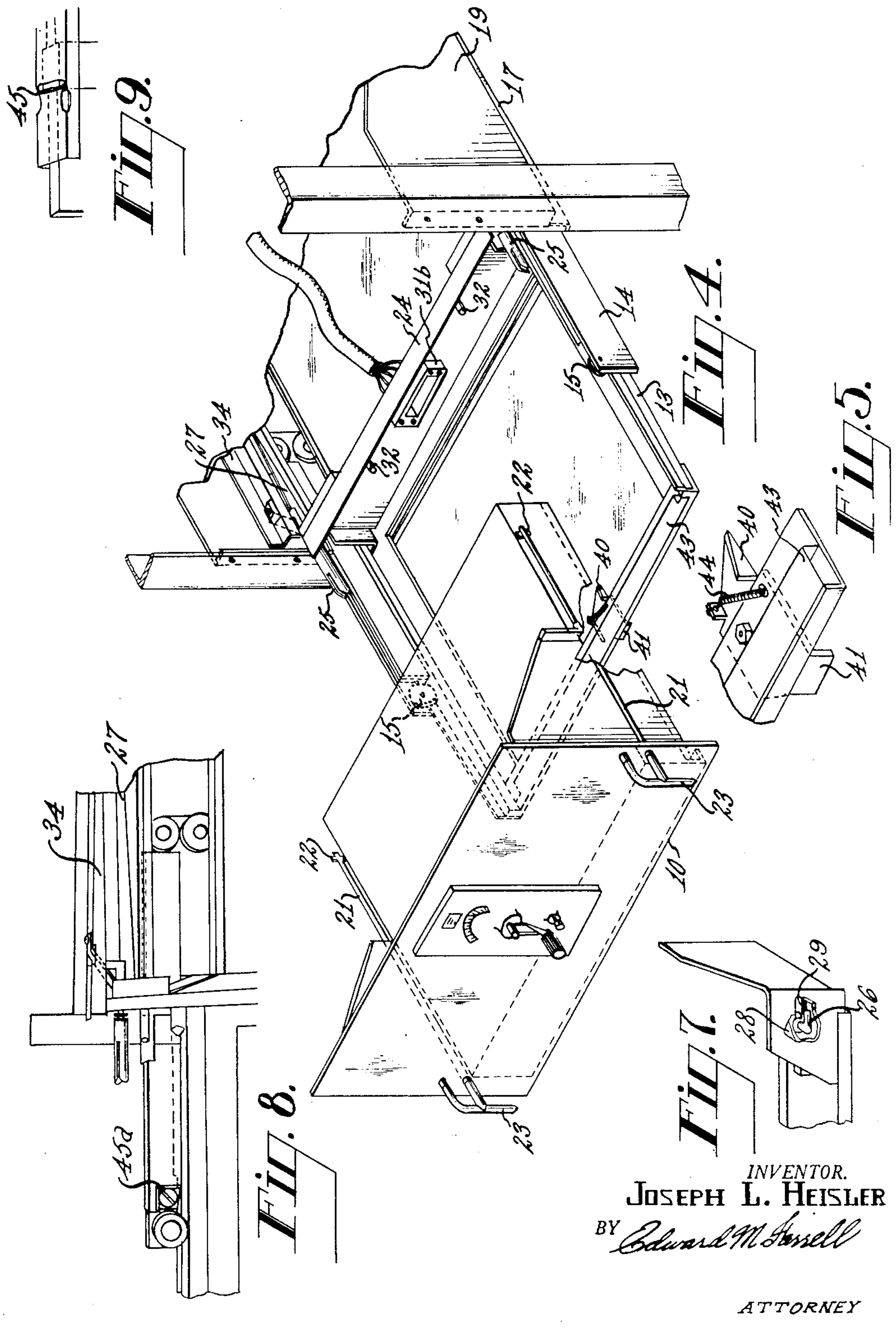
Fig. 4 is a perspective view similar to Fig. 1 but with the chassis disconnected from its carrier.
Fig. 5 is an enlarged view of the interlocking mechanism shown in Fig. 3.
Fig. 7 is a detail view, on enlarged scale, of the arrangement for locking the chassis in operating position.
Fig. 8 is a detail view on enlarged scale showing the stops for limiting the travel of the carriers in the extended position.
Fig. 9 is a detail view, on a much enlarged scale, showing in greater detail the stops in Fig. 8.

Front panel 11 and side brackets 12 of chassis 10 provide mounting holes for a pair of lock actuators 21 respectively disposed on opposite sides of the chassis and preserve their alignment with lock members 25 later described. The lock actuators 21 are provided at their inner ends with transverse keys or pins 22, and at their outer ends with handles 23. As best shown in Fig. 4, carrier 13, which in form is a rectangular frame, has a rear cross-piece 24, on which are mounted movable lock members 25, alignment studs 32 and mating connector **31*b*** whose contacts are connected by cable to other units of the system.

Figures 2, 6:
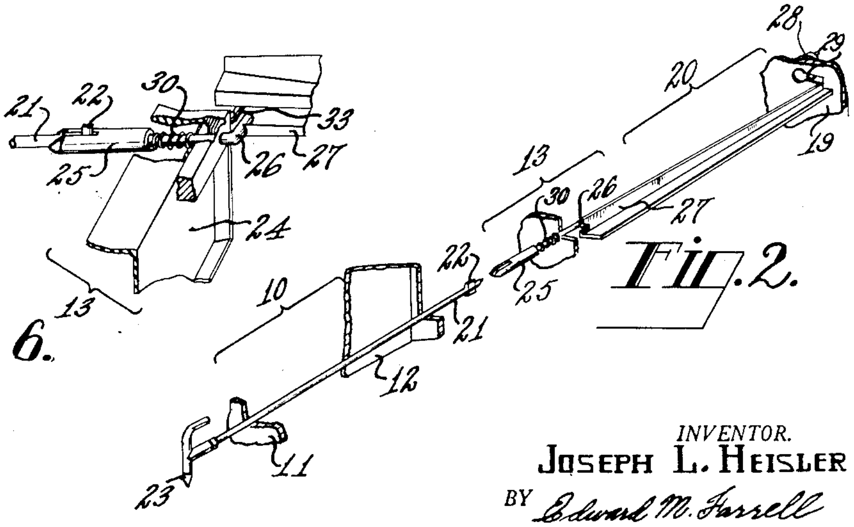
Fig. 2 is a detail view showing the positions of locking members when the chassis is removed from its carrier.
Fig. 6 is a detail view, on enlarged scale, showing the carrier locked in withdrawn position.

As shown in Figs. 2 and 6, lock members 25 are provided at their front or outer ends with keyways of suitable shape for reception and engagement of key members of actuators 21 and are provided at their rear or inner ends with angular extensions 26 for engagement with fixed lock members 27 and 28 attached to frame members 18 and 19 of rack 20. Slots 29 (Figs. 1, 2, 7) are provided in the rear wall of the frame members 18 and 19 in alignment with the angular extensions 26 of lock members 25 on carrier 13. Lock members 28 mounted on the rear of frame members 18 and 19 provide camming and locking surfaces for engagement with extensions 26 when the chassis and carrier are in their innermost position corresponding with the normal operating position of the unit. Springs 30 bias the lock member extensions 26 toward engagement with shoulders of fixed lock members 27 when the carrier 13 is at its outer position (Figs. 1, 2) and toward alignment with slot 29 and disengagement from fixed lock member 28 when carrier 13 is at its inner position (Figs. 1, 7). Thus, when carrier 13 is in its outer position, the spring 33 also forces lock member extensions 26 toward engagement with shoulders of fixed lock members 27. The stops **45, 45*a* (Figs. 8 and 9) on the carrier 13 and mount 14 limit travel of mount 14**.

When chassis 10 is mounted on carrier 13 (Fig. 1), the alignment studs 32 of the carrier project into corresponding sockets or sleeves of the chassis; connector **31*a* of the carrier engages the mating connector 31*b* on the chassis; and keys 22 of lock actuators 21 of the chassis fit into lock member 25 of the carrier. Fig. 4 shows the parts before such mounting and Fig. 1 shows the parts after the chassis 10 is so mounted. To move chassis 10 inwardly from inspection position to operating position, handles 23 are first rotated to move extensions 26** upwardly and clear of lock members 27 and then chassis 10, carrier 13 and mount 14 are moved into the rack 20. As the chassis is pushed inwardly, the upper surfaces of lock members 27 which slidably engage the locking-member extensions 26 allow them to move under the bias from springs 30 until extensions 26 align with slots 29 in the rear walls of the rack. Upper guide members 34, shown in Figs. 1 and 4, are positioned in spaced relation to members 27, forming a guide channel for extensions 26. Front panel 11 of the chassis abuts against the front of rack 20 after the extensions 26 pass through slots 29 and are in position for movement by lock actuator 21 to engage lock member 28 on the rear face of the rear rack wall. With the carrier and chassis in their inner position, rotation of handles 23 against the bias of springs 30 moves extensions 26 into locking engagement with lock members 28. This engagement locks the whole assembly in the rack. The sloping cam surfaces of lock members 28 assure drawing the assembly to a tight fit.

When it is desired to remove chassis 10 from rack 20 (Fig. 4), it must first be withdrawn from the above-described operating position to the inspection position (Fig. 1). To do this, handles 23 are first turned to move extensions 26 out of engagement with lock members 28 to release the chassis, carrier and mount from locked engagement with the rack and are then pulled to move the chassis toward its outer, inspection position. As this outward movement progresses, the latch extensions 26 ride along the surfaces of lock members 27 and, at the end of this movement, drop into locking engagement therewith, being urged in that direction by the biasing force of springs 30, 33.

To remove chassis 10 from carrier 13, as for work at the test bench, the chassis locking means 40 (Figs. 3, 4 and 5), when included, must be swung so that its extension 41 swings out of the space between the inturned lower flange of chassis 10 and the carrier 13. With extension 41 out of this space, chassis 10 can be tilted upwardly from the front so that reduced extensions 42 of the front cross-piece 43 (Fig. 3) of carrier 13 no longer fits into notches in chassis 10. Chassis 10 can be removed from carrier 13 by pulling on it by means of the handles 23 and the resulting outward motion effects separation of connectors 31*a*, 31*b*, disengagement of keys 22 of lock actuators 21 from lock members 25, and withdrawal of alignment studs 32 from chassis 10.

Actuation of chassis locking means 40, against the pull of spring 44, to where extension 41 is in the dotted position of Fig. 3, serves only to remove extension 41 from between the angular extension of chassis 10 and carrier 13. Chassis 10 remains held in position by engagement of reduced extensions 42 of carrier cross-piece 43 in notches in chassis 10 and by engagement of the sides of the chassis with mount 14 until the chassis 10 is deliberately lifted and pulled out of carrier 13. There is no possibility of an accidental movement of chassis locking means 40 allowing a delicate and expensive chassis to fall or slide out of the rack, to be damaged by impact with a floor or deck. The removal must be by a lifting force capable of supporting the chassis weight. When the weight of the equipment on the chassis is sufficiently great to preclude accidental dislodgment, the locking means 40 may be omitted.

Carrier 13 remains locked in its outer position (Fig. 6) until the chassis 10, or its replacement, is mounted thereon, whereupon handles 23 can be rotated to disengage extensions 26 from lock members 27 and the carrier and chassis can be returned to their inner position. Concurrently with mounting of chassis 10 upon carrier 13, the connectors 31*a* and 31*b* reestablish electrical circuits returning chassis 10 to operable condition in the system.

As the chassis is lowered onto the carrier 13, the inturned lower edge of chassis 10 engages the latch extension 41 forcing the latch to move about its off-center pivot; upon continued lowering, the inturned edge passes below the extension 41 whereupon the latch swings to position (Fig. 3) between carriage and the inturned ledge to lock the chassis to carrier 13.

It shall be understood that changes in and modifications of the aforesaid exemplary embodiment of the invention may be made within the scope of the appended claims.

What is claimed is:

1. In a mounting rack for chassis-type subcomponents of a system, chassis mounting means permitting movement of a chassis out of the rack for inspection while operably connected to the system and for disconnection and removal from the rack and for locking the chassis in each position, comprising a carrier for said chassis, a mount for said carrier having a movable member supporting said carrier and a member fixedly mounted on the rack in which fixed member the movable member rolls to provide for movement of said carrier in and out of said rack, a first lock member fixedly mounted on said rack, a second lock member fixedly mounted on said rack, a movable lock member on said carrier adapted to engage said first lock member when the carrier is at its inner position and to engage said second lock member when the carrier is at its outer position and having spring biasing means to produce angular motion into engagement with said second lock member and out of engagement with said first lock member, and a lock-actuator on said chassis adapted to couple with said movable lock member upon placement of said chassis upon said carrier, thereby to rotate said movable lock member to disengage the movable lock member from the second lock member when the carrier is at its outer position and to rotate the movable lock member between disengagement and engagement with the first lock member when the carrier is at its inner position.

2. An arrangement for mounting the chassis of electrical equipment in a rack comprising a chassis-carrier slidably supported for movement to an inner position within the rack and to an outer position for which the chassis is clear of the rack, a first locking means attached to the rack and having an opening at the rear end of the rack, a second locking means comprising structure attached to the rack and extending from said opening to the front end of the rack, a latch which is rotatably mounted at the rear of said carrier and which has an extension for engaging the front end of said structure to lock the carrier in its said outer position and which is guided by said structure to said opening as said carrier is moved to its said inner position, and a latch-actuator rotatably mounted on said chassis projecting through the front panel thereof and extending to the rear of said chassis detachably to engage said latch, rotation of said actuator in one direction releasing said latch extension from the front end of said structure of the second locking means to permit movement of the chassis and carrier to said inner position whereas rotation of said actuator in the reverse direction effects locking engagement of said latch extension with said first locking means to lock said chassis and carrier in said inner position.

References Cited in the file of this patent

UNITED STATES PATENTS

| | | |
|---|---|---|
| 1,040,963 | Strong et al. | Oct. 8, 1912 |
| 1,228,067 | Severance | May 29, 1917 |
| 1,696,870 | Spencer | Dec. 25, 1928 |
| 2,227,993 | Anderson | Jan. 7, 1941 |
| 2,298,828 | Mahoney | Oct. 13, 1942 |
| 2,486,764 | Singer | Nov. 1, 1949 |
| 2,510,681 | Campbell | June 6, 1950 |
| 2,559,218 | Lewis | July 3, 1951 |
| 2,630,364 | Gleason | Mar. 3, 1953 |
| 2,655,422 | Gussack | Oct. 13, 1953 |

OTHER REFERENCES

"Electronic Engineering," January 1950, pages 27–31. (Copy in Div. 51.)